United States Patent
Kruglick (10) Patent No.: US 9,619,867 B2
(45) Date of Patent: Apr. 11, 2017

(54) COLOR SMEAR CORRECTION BASED ON INERTIAL MEASUREMENTS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 226 days.

(21) Appl. No.: 14/413,223

(22) PCT Filed: Apr. 3, 2014

(86) PCT No.: PCT/US2014/032822
§ 371 (c)(1),
(2) Date: Jan. 6, 2015

(87) PCT Pub. No.: WO2015/152923
PCT Pub. Date: Oct. 8, 2015

(65) Prior Publication Data
US 2016/0132994 A1    May 12, 2016

(51) Int. Cl.
*G06T 5/00* (2006.01)
*G06T 7/40* (2006.01)
(Continued)

(52) U.S. Cl.
CPC .............. *G06T 5/00* (2013.01); *G06K 9/4652* (2013.01); *G06T 7/20* (2013.01); *G06T 7/408* (2013.01); *G09G 3/2003* (2013.01); *G09G 5/003* (2013.01); *H04N 9/045* (2013.01); *H04N 9/3129* (2013.01); *H04N 9/3182* (2013.01); *H04N 9/3194* (2013.01); *G02B 27/017* (2013.01);
(Continued)

(58) Field of Classification Search
None
See application file for complete search history.

(56) References Cited

U.S. PATENT DOCUMENTS 5,032,913 A * 7/1991 Hattori .................. H04N 5/144
                                                    348/621
5,420,644 A * 5/1995 Watanabe .......... H04N 5/23248
                                                    348/578

(Continued)

OTHER PUBLICATIONS

"MicroVision's PicoP® display technology," accessed at http://web.archive.org/web/20131015104059/http://www.microvision.com/solutions/index.html, accessed on Oct. 9, 2014, pp. 1-2.
International search report and written opinion for PCT application No. PCT/US2014/032822 mailed on Sep. 5, 2014.

*Primary Examiner* — Frank Chen
(74) *Attorney, Agent, or Firm* — Turk IP Law, LLC (57) ABSTRACT

Technologies are generally described to correct color smear in an image generated using a sequential color system. In some examples, a correction system for see-through displays may use inertial movement data to compute the relative motion of the visual backdrop to correct color amplitudes and reduce or eliminate motion-caused color smear. A system according to embodiments may compute the angular motion of the background from inertial inputs, compute the pixel-angle equivalent motion time, and apply sequential color balancing across a time that corresponds to the pixel-angle motion time.

20 Claims, 7 Drawing Sheets

(51) Int. Cl.
  *G06T 7/20* (2006.01)
  *H04N 9/04* (2006.01)
  *H04N 9/31* (2006.01)
  *G09G 3/20* (2006.01)
  *G09G 5/00* (2006.01)
  *G06K 9/46* (2006.01)
  *H04N 5/14* (2006.01)
  *G02B 27/01* (2006.01)

(52) U.S. Cl.
  CPC ............. *G09G 2310/0235* (2013.01); *G09G 2320/0242* (2013.01); *G09G 2320/0261* (2013.01); *H04N 5/144* (2013.01)

(56) References Cited

U.S. PATENT DOCUMENTS

| | | | |
|---|---|---|---|
| 7,050,074 | B1 | 5/2006 | Koyama |
| 9,022,576 | B2 * | 5/2015 | Jeong ............... G09G 3/002 353/84 |
| 2007/0036460 | A1 | 2/2007 | Koch |
| 2009/0278766 | A1 | 11/2009 | Sako et al. |
| 2010/0073568 | A1 * | 3/2010 | Van Ostrand ........ H04N 9/3111 348/578 |
| 2010/0220225 | A1 | 9/2010 | Yu et al. |
| 2012/0327139 | A1 | 12/2012 | Margulis |
| 2013/0182321 | A1 | 7/2013 | Silverstein |

\* cited by examiner

COLOR SMEAR CORRECTION BASED ON INERTIAL MEASUREMENTS

CROSS-REFERENCE TO RELATED APPLICATION

This Application is the U.S. National Stage filing under 35 U.S.C. §371 of PCT Application Ser. No. PCT/US2014/032822 filed on Apr. 3, 2014. The PCT application is hereby incorporated by reference in its entirety.

BACKGROUND

Computing devices continue to become smaller and more portable, and there is significant interest in developing miniaturized, wearable computing devices. Such wearable computing devices in general are also coupled with miniaturized displays to display information to users. A wearable computing device may display information on an integrated display similar to a wristwatch (for example, a "smartwatch") or on a display in the form of spectacles, goggles, visors, or similar. Displays in the latter situation may project an image on a transparent or translucent prism in the user's field-of-view, thus allowing the user to view the image and at least some portion of the environment behind the image.

SUMMARY

The present disclosure generally describes techniques for correcting color smear in an image generated using a sequential color system.

According to some examples, methods are provided to correct color smear in an image generated using a sequential color system. An example method may include determining at least one movement parameter associated with the image and computing a view duration associated with the image based on the at least one movement parameter. The method may further include determining a color correction to the sequential color system based on the view duration and a timing parameter associated with the sequential color system and applying the color correction to the sequential color system for every pixel in the image.

According to other examples, a computing device is provided to generate an image and correct color smear in the generated image. The computing device may include a sequential color system configured to switch between multiple different color components based on a color component projection time to generate the image and a processor block coupled to the sequential color system. The processor block may be configured to determine at least one movement parameter associated with the image, compute a view duration associated with the image based on the at least one movement parameter, and determine a color imbalance based on the view duration and the color component projection time. The processor block may be further configured to determine a color correction to the sequential color system based on the view duration and the color component projection time and apply the color correction to the sequential color system for each pixel in the image.

According to further examples, an inertial color smear correction module is provided to correct color smear in a generated image. The module may include an inertial sensor data module communicatively coupled to at least one inertial sensor and a processor block coupled to the inertial sensor data module. The processor block may be configured to determine at least one movement parameter associated with a generated image based on an inertial measurement provided by the inertial sensor data module where the movement parameter(s) include a translational and/or a rotational parameter associated with the image and/or an entity to which the image is displayed. The processor block may be further configured to compute a view duration associated with the image based on the movement parameter(s), determine a color correction to a sequential color system used to generate the image based on the view duration and a timing parameter associated with the sequential color system, and apply the color correction to the sequential color system for each pixel in the image.

According to yet further examples, a computer readable medium may store instructions which when executed on one or more computing devices may execute a method to correct color smear in an image generated using a sequential color system. The methods may be similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to correction of color smear in an image generated using a sequential color system.

Briefly stated, technologies are generally described to correct color smear in an image generated using a sequential color system. In some examples, a correction system for see-through displays may use inertial movement data to compute the relative motion of the visual backdrop to correct color amplitudes and reduce or eliminate motion-caused color smear. A system according to embodiments may compute the angular motion of the background from inertial inputs, compute the pixel-angle equivalent motion time, and apply sequential color balancing across a time that corresponds to the pixel-angle motion time.

A sequential color system may use a sequence of different colors to generate a displayed image. For example, a sequential color system may use a monochrome light modulator and project multiple color components (for example, red, green, and blue, although secondary colors may also be used) in sequence through or onto the modulator. The projection time for each color component may be short enough such that the human eye will time-average the projected color components into desired colors. Sequential color systems, while relatively inexpensive and compact, may suffer from color smearing when displaying images of fast-moving objects or images against a moving background.

Figure 1:
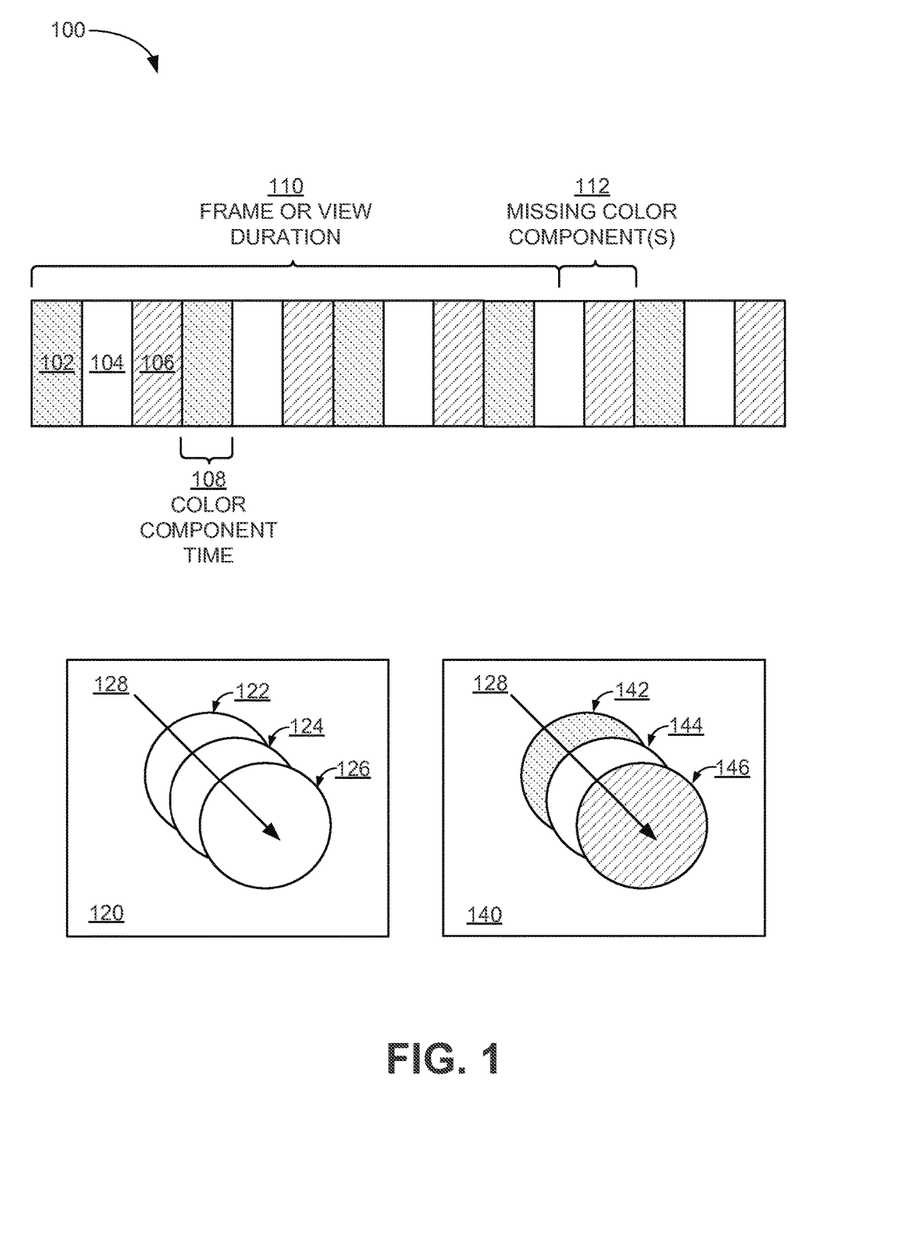
FIG. 1 illustrates how color smear may occur in an image generated using a sequential color system.

FIG. 1 illustrates how color smear may occur in an image generated using a sequential color system, arranged in accordance with at least some embodiments described herein.

As shown in a diagram 100, a sequential color system may project a sequence of color components 102, 104, and 106 to generate a displayed image. For example, the color components 102, 104, and 106 may be red, green, and blue, respectively. The sequential color system may project each of the color components 102, 104, and 106 for a duration of a color component time 108, and may repeat projection of the sequence of color components. For example, the sequential color system may first project the color component 102 for the color component time 108, then project the color component 104 for the color component time 108, then project the color component 106 for the color component time 108, then again project the color component 102. In other embodiments, a sequential color system may project more or fewer color components.

As mentioned above, color smearing may occur when images containing fast-moving objects or images against a moving backdrop are displayed using sequential color systems. An image 120 may show an object moving with motion 128 in a series of frames. For example, at a first point in time the image 120 may show a frame 122 with the object. At a second point in time, subsequent time the image 120 may show a frame 124 with the object partially overlapping the object in the frame 122 but shifted some distance away along the direction of the motion 128. At a third point in time the image 120 may show a frame 126 with the object partially overlapping the object in the frame 124 but shifted some distance away along the direction of the motion 128.

Each frame of a displayed image may have an associated frame or view duration, which may represent the amount of time the particular frame is displayed. For example, each of the frames in the image 120 may have a frame duration 110, during which time color components (for example, the color components 102, 104, and 106) are successively projected in order to generate the image. As depicted in the diagram 100, the frame duration 110 may not correspond neatly to the time it takes for the sequential color system to project a complete color sequence in some embodiments. For example, a complete color sequence may include the projection of the three color components 102, 104, and 106, and the projection may take three times as long as the color component time 108. The frame duration 110 may have a duration of ten and a half times the color component time 108, corresponding to about three and a half complete color sequences. As a result, the last incomplete color sequence in each of the frame durations 110 may result in a color component imbalance in the displayed image and cause fast-moving objects in the displayed image to appear to change color as they move. For example, an image 140 (similar to the image 120) may show an object moving with a motion 128 in a series of frames 142, 144, and 146, similar to the frames 122, 124, and 126.

At a first time, the image 140 may show a frame 142 with the object, and at a second subsequent time the image 140 may show a frame 144 with the object partially overlapping the object in the frame 142 but shifted some distance away along the direction of the motion 128. Because the frame duration 110 does not correspond to one or more complete color sequences, a color component imbalance results, and the non-overlapping object area in the frames 142 and 144 may appear with a different color with respect to the overlapping object area in both frames. In particular, the non-overlapping object area may appear to have a deficiency of the color component 106 (or an excess of the color component 102), because the discrepancy between the frame duration 110 and the complete color sequence time may result in missed color component display time 112. As a result, the moving object may appear to have a different color on its trailing edge (represented by the non-overlapping area of the object in the frame 142) than at its center. The same situation may occur at the object's leading edge, which may appear to have a different color than both the object's trailing edge and its center. This color variation may be referred to as "color smear".

Figure 2:
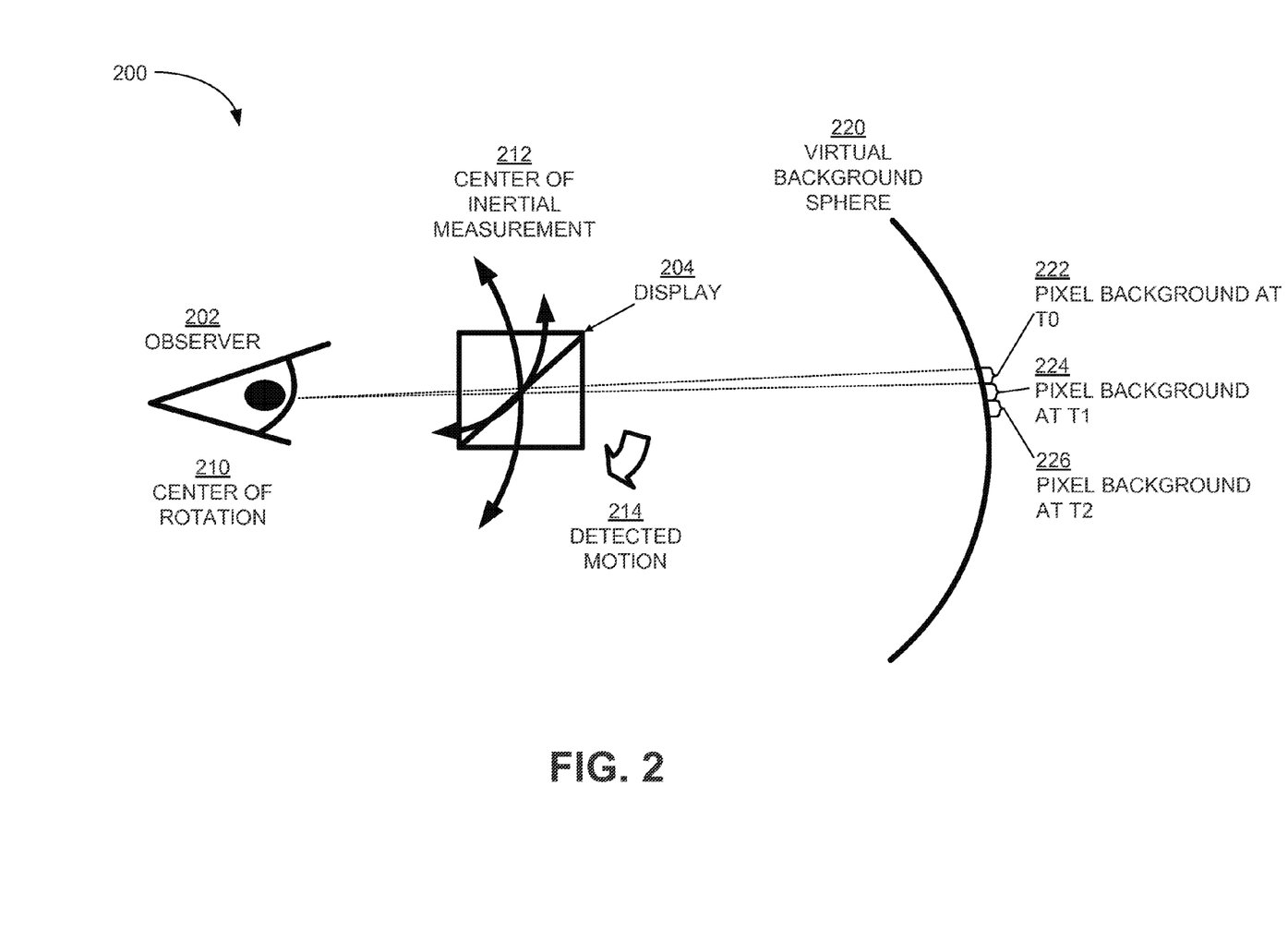
FIG. 2 illustrates an example system where color smear in an image generated on a transparent display may be corrected using inertial measurements to determine motion.

FIG. 2 illustrates an example system where color smear in an image generated on a transparent display may be corrected using inertial measurements to determine motion, arranged in accordance with at least some embodiments described herein.

As shown in a diagram 200, a display 204 may be configured to generate an image using a sequential color system and display the image to or for viewing by an observer 202 (for example, a display user or an entity to which the image is displayed). The display 204 may be a wearable display device or a fixed heads-up display with a see-through transparent or translucent display upon which the image is projected for viewing by the observer 202.

As described above, a fast-moving object in an image generated using a sequential color system may suffer from color smearing. Static images generated using a sequential color system and displayed on see-through displays such as the display 204 may also suffer from color smearing. However, instead of resulting from the movement of an object in the displayed image, color smear may result due to the movement of a background behind the displayed image, viewable by the observer 202 due to the see-through nature of the display 204. In particular, color smearing of a see-through display cannot be fixed by aligning color component time multiples with frame times because the amount the eye perceives a color is dependent on the coloration seen behind it and the motion of the outside world does not align itself with frame timing.

To address color smearing in a see-through display such as the display 204, view durations may be used to compensate for color component imbalances. A view duration in the context of a see-through display such as the display 204 is similar to a frame duration as described above in conjunction with FIG. 1 in that it may represent the amount of time a displayed image or portion of a displayed image remains static with respect to the image background. In the example described in conjunction with FIG. 1, the fast-moving object may remain static within a particular frame (for example, one of the frames 142, 144, and 146), and may change location (and therefore background) between consecutive frames. For a see-through display such as the display 204, an otherwise static image may remain static while the display and the observer (for example, the observer 202) remain unmoving. However, if the display and/or the observer move (for example, rotate or translate), the image background (that is, the portion of the environment viewed through the image displayed on the display 204) may change. As such, a view duration in the context of a see-through display such as the display 204 may represent the amount of time a displayed image or portion of a displayed image has the same background.

In situations where a see-through display is in motion, inertial measurements of the display and/or the observer may be used to determine view durations. In the diagram 200, the display 204 may serve as a center of inertial measurement 212, and may have one or more associated inertial sensors. The observer 202 may be treated as a center of rotation 210 with a known distance from the center of inertial measurement 212. A detected motion 214 (for example, a rotation and/or a translation at the observer 202 and/or display 204) may be measured by the inertial sensors associated with the display 204 and mapped into a background transition on a virtual background sphere 220. For example, the inertial sensors at the display 204 may determine that a particular portion or pixel of a displayed image has a first background 222 at a first time T0.

Subsequently, the detected motion 214, having a particular rate of motion, may cause the particular image portion/pixel to change to a second background 224 at a second time T1 and then to a third background 226 at a third time T2. The time differences between the first time T0 and the second time T1, and the time difference between the second time T1 and the third time T2 may then be used to determine a rate of motion for the image portion/pixel, which in turn may be used to derive one or more view durations. For example, the time difference between the first time T0 and the second time T1 may be a first view duration, and the time difference between the second time T1 and the third time T2 may be a second view duration. The derived view durations may then be used to generate a color correction to compensate for color smearing, as described below.

While the color correction may be applied to the sequential color system for every pixel in the image, the color correction may not shift the actual displayed color, as when a particular pixel lacks a component of the adjusted color. For example, pure blue may not get changed if the red illumination is changed. While the red component, for example, may be changed for every pixel in the image the final displayed effect may be negligible for black pixels or colors that do not contain red because a proportional change to a negligible value continues to be negligible.

Figure 3:
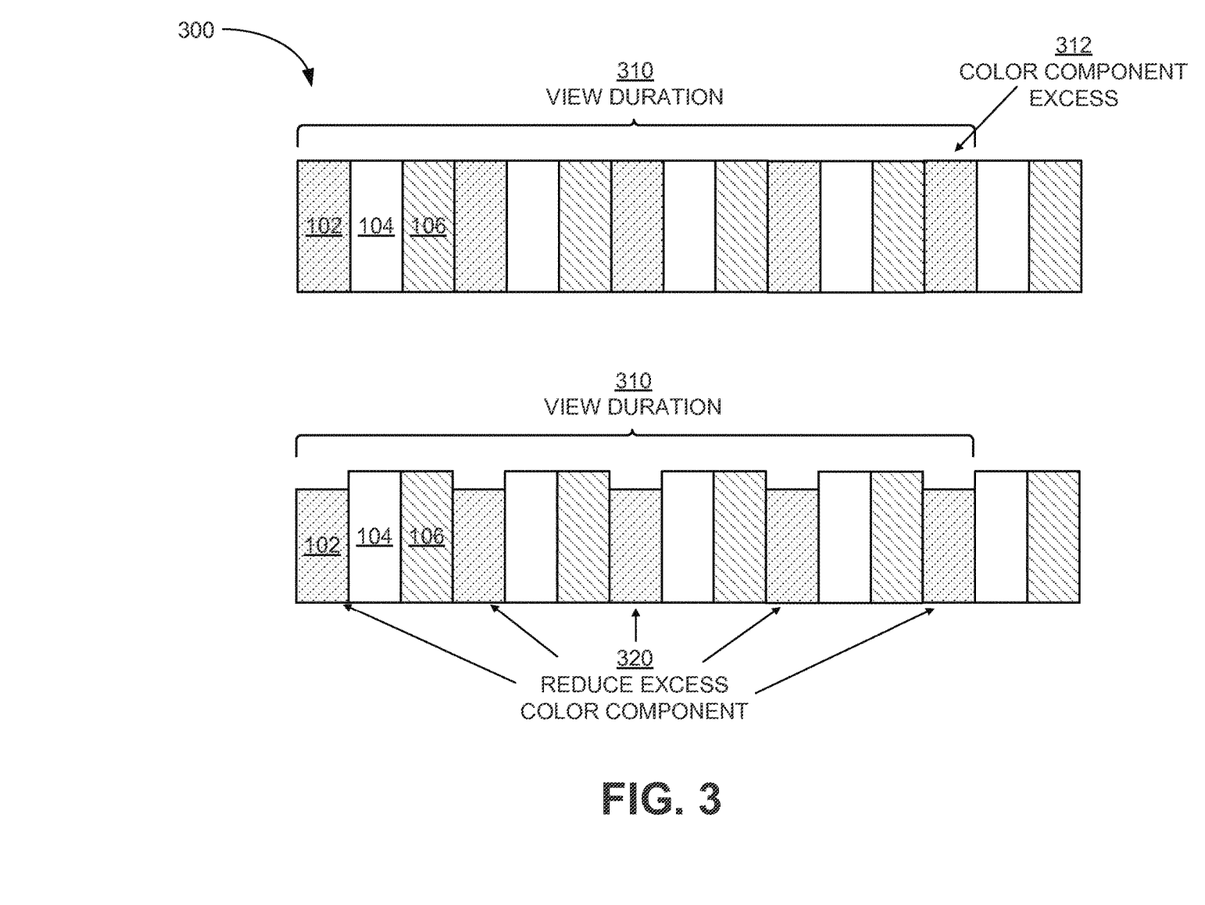
FIG. 3 illustrates an example sequential color system where color smear in a generated image may be corrected.

FIG. 3 illustrates an example sequential color system where color smear in a generated image may be corrected, arranged in accordance with at least some embodiments described herein.

As shown in a diagram 300, which is similar in part to the diagram 200 in FIG. 2, a sequential color system may project a sequence of the color components 102, 104, and 106 to generate an image for display (for example, on the display 204). As described above in conjunction with FIG. 2, inertial measurements associated with the display 204 may be used to derive one or more view durations associated with an image projected on the display 204, such as a view duration 310. The view duration 310 may represent the amount of time a displayed image or portion of a displayed image. As with the frame duration 110, the length of the view duration 310 may not match the complete color sequence projection time (that is, the time between starting to project the color component 102 and ending the projection of the color component 106) of the sequential color system. As a result, a color component excess 312 of the color component 102 may result, where the color component excess 312 is determined based on the view duration 310 and one or more color component times (for example, the color component time 108). For example, in the diagram 300 the view duration 310 lasts four complete color sequences and one incomplete color sequence with the color component 102. Accordingly, there may be a 20% excess of the color component 102, which may be determined by dividing the color component(s) present in the incomplete color sequence (that is, the color component 102) by the amount of the same color component(s) in the complete color sequences. While an incomplete color sequence is described in the context of providing a color component excess, in other embodiments an incomplete color sequence may instead by described in the context of having a color component deficiency. For example, the diagram 300 may be described as suffering from a deficiency of the color components 104 and 106 instead of an excess of the color component 102.

To address such a color component excess, the sequential color system may be configured to reduce the amount of the color component that is in excess such that the overall color component content projected during a view duration is balanced. In the diagram 300, the sequential color system of FIG. 3 may be configured to perform a reduction 320 of the amount of color component 102 such that the projected amounts of the color components 102, 104, and 106 are balanced with respect to each other. For example, as described above the view duration 310 may result in a 20% excess of the color component 102. Accordingly, the sequential color system may be configured to apply a color component imbalance correction by reducing the amount of the color component 102 projected by 20%. The sequential color system may be configured to adjust the amount of a projected color component by adjusting the time the color component is projected (duration) and/or adjusting the brightness with which the color component is projected. The sequential color system may be further configured to apply the color component correction at every pixel in the image and/or at a light source (for example, a monochrome light modulator) for the image.

The color correction above may be described in the context of reducing one or more excess color components. However, a color correction may also or instead involve increasing one or more deficient color components. Also, while the color correction above is described in the context of a wearable see-through display, the same color correction techniques may be used for a fixed see-through display (for example, a vehicle windshield capable of displaying projected images) or a mobile projector.

In some embodiments, a rate of change of the image background may be used to determine the color correction when available. For example, a camera configured to observe the image background may capture background information such as brightness and contrast variations. This background information may then be used to further adjust the color correction.

Figure 4:
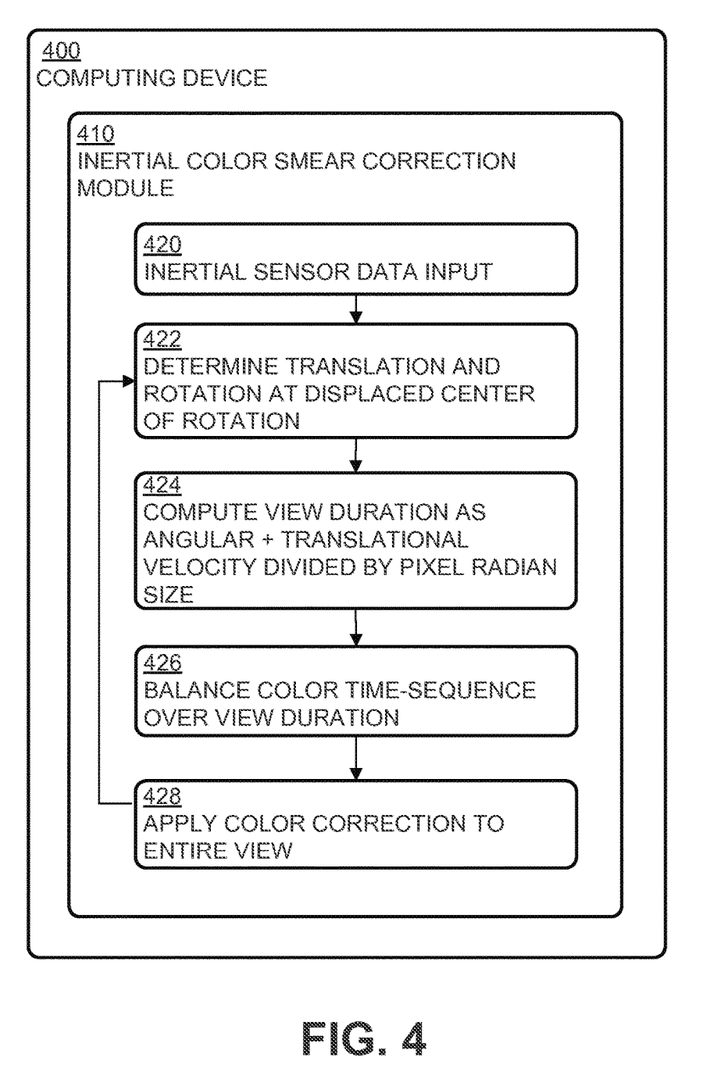
FIG. 4 illustrates an example inertial color smear correction module where inertial data may be used to correct color smear in an image generated using a sequential color system.

FIG. 4 illustrates an example inertial color smear correction module 410 where inertial data may be used to correct color smear in an image generated using a sequential color system, arranged in accordance with at least some embodiments described herein.

The inertial color smear correction module 410 may be configured to perform one or more operations, functions, or actions as illustrated by one or more of blocks 420-428, and may in some embodiments be performed by a computing device such as a computing device 400 in FIG. 4. Although some of the blocks are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided.

The process for color smear correction performed by the inertial color smear correction module 410 may begin with block 420, "INERTIAL SENSOR DATA INPUT", where the inertial color smear correction module 410 may receive data from inertial sensors associated with a display (for example, the display 204) or an observer (for example, the observer 202).

Block 420 may be followed by block 422, "DETERMINE TRANSLATION AND ROTATION AT DISPLACED CENTER OF ROTATION", where the inertial color smear correction module 410 may determine one or more rotational and/or translational parameters (for example, rotational and/or translational velocity or acceleration) associated with the display and/or the observer from the inertial data received in the block 420.

Block 422 may be followed by block 424, "COMPUTE VIEW DURATION AS ANGULAR+TRANSLATIONAL VELOCITY DIVIDED BY PIXEL RADIAN SIZE", where the inertial color smear correction module 410 may compute a view duration (for example, the view duration 310) from the parameters determined in the block 422. In some embodiments, the view duration may be computed by dividing the angular (rotational) and translational velocity, expressed as angular radians projected to a virtual background radius, by a pixel radian size.

Block 424 may be followed by block 426, "BALANCE COLOR TIME-SEQUENCE OVER VIEW DURATION", where the inertial color smear correction module 410 may determine a color component excess (for example, the color component excess 312) or a color component deficiency based on the computed view duration. The inertial color smear correction module 410 may then determine a color correction to reduce any color component imbalance, as described above in FIG. 3. For example, the color correction may involve reducing and/or increasing the amount of one or more color components over the computed view duration.

Block 426 may be followed by block 428, "APPLY COLOR CORRECTION TO ENTIRE VIEW", where the inertial color smear correction module 410 may apply the color correction determined in the block 424 to the entire displayed image. For example, the color correction may be applied at every pixel in the image and/or may be applied at a light source for the image.

In some embodiments, block 428 may be again followed by block 422 as described above, and the inertial color smear correction module 410 may again perform blocks 422-428. For example, the inertial color smear correction module 410 may again perform blocks 422-428 in response to determining that a previously computed view duration has elapsed.

Figure 5:
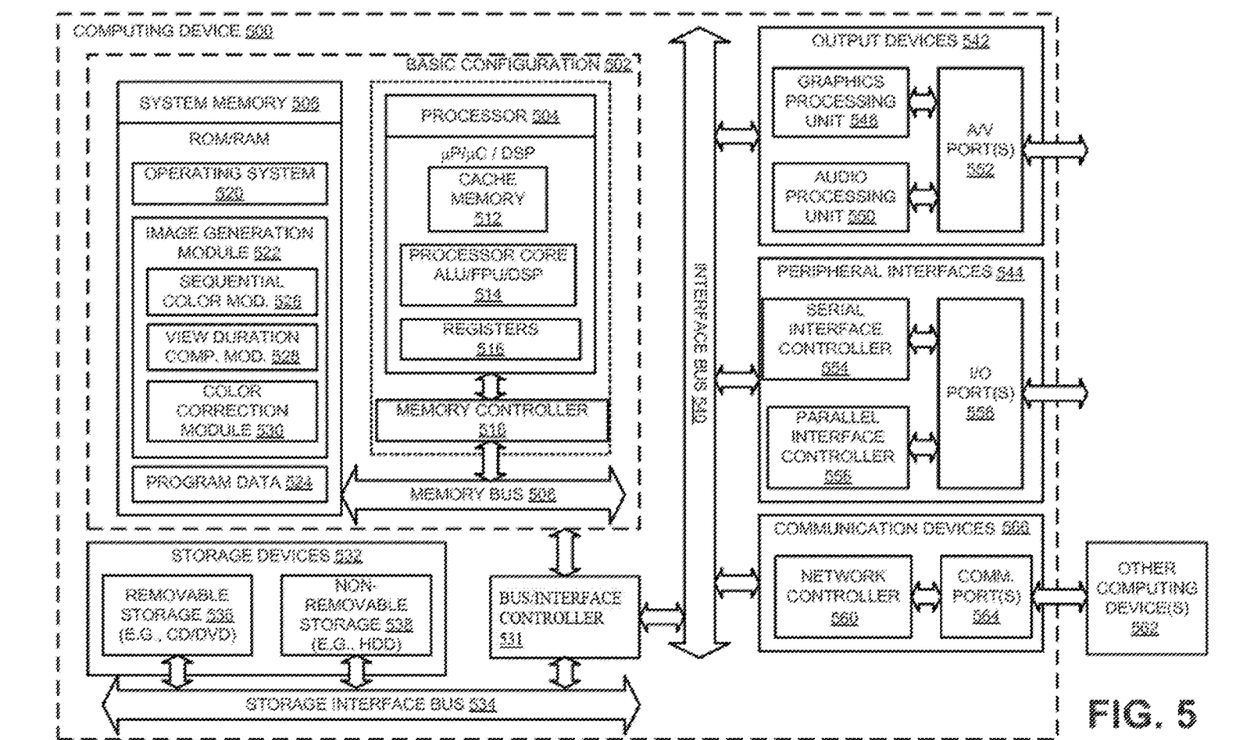
FIG. 5 illustrates a general purpose computing device, which may be used to provide color smear correction in images generated using sequential color systems.

FIG. 5 illustrates a general purpose computing device 500, which may be used to provide color smear correction in images generated using sequential color systems, arranged in accordance with at least some embodiments described herein.

For example, the computing device 500 may be used to provide color smear correction in images as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an image generation module 522, and program data 524. The image generation module 522 may include a sequential color module 526 to generate an image, a view duration computation module 528 to determine view durations associated with a generated image, and a color correction module 530 to adjust the sequential color module 526 as described herein.

The computing device 500 may have additional features or functionality, and additional interfaces to facilitate communications between the basic configuration 502 and any desired devices and interfaces. For example, a bus/interface controller 531 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 531. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
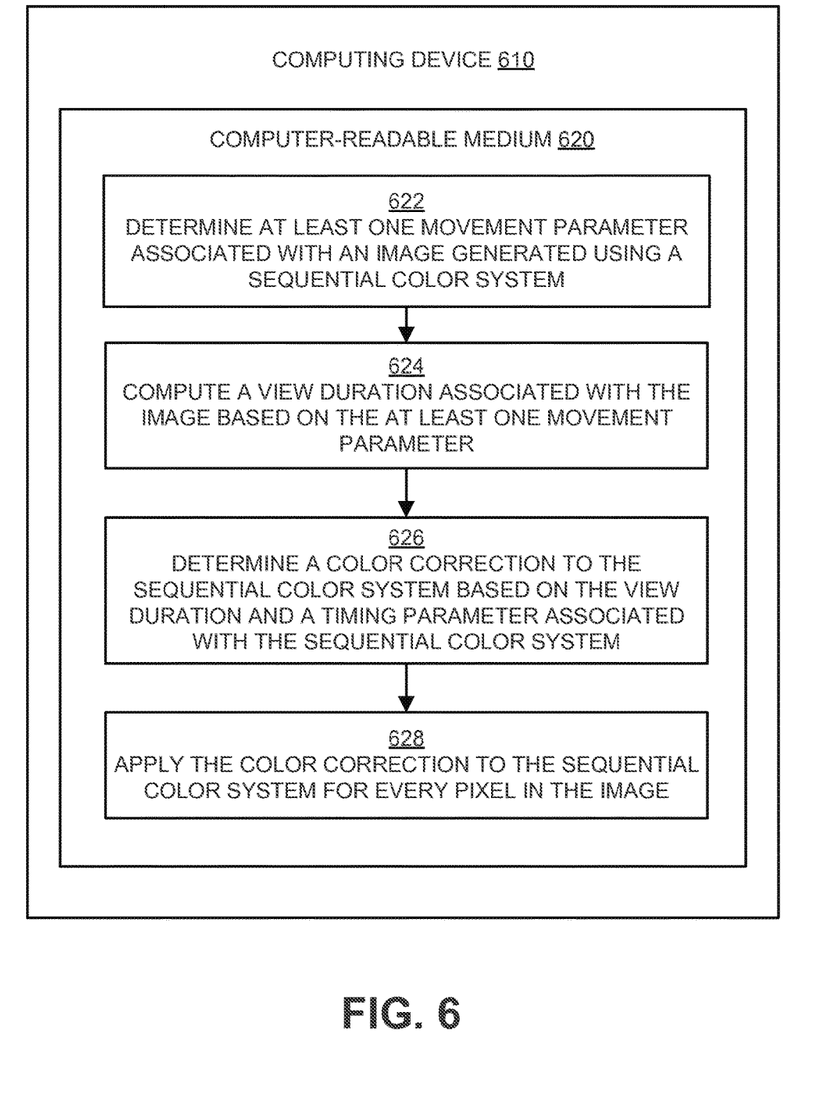
FIG. 6 is a flow diagram illustrating an example method to correct color smear in images generated using sequential color systems that may be performed by a computing device such as the computing device in FIG. 5.

FIG. 6 is a flow diagram illustrating an example method to correct color smear in images generated using sequential color systems that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for correcting color smear in images generated using sequential color systems may begin with block 622, "DETERMINE AT LEAST ONE MOVEMENT PARAMETER ASSOCIATED WITH AN IMAGE GENERATED USING A SEQUENTIAL COLOR SYSTEM", where an inertial color smear correction module (for example, the inertial color smear correction module 410) may determine at least one movement parameter associated with an image generated using a sequential color system (for example, the sequential color module 526). The movement parameter(s) may be generated from data received from one or more inertial sensors associated with the display and/or an observer, and may include rotational and/or translational parameters associated with the display and/or the observer.

Block 622 may be followed by block 624, "COMPUTE A VIEW DURATION ASSOCIATED WITH THE IMAGE BASED ON THE AT LEAST ONE MOVEMENT PARAMETER", where the inertial color smear correction module or a view duration computation module (for example, the view duration computation module 528) may use the determined movement parameter(s) to compute a view duration (for example, the view duration 310) associated with the displayed image, as described above.

Block 624 may be followed by block 626, "DETERMINE A COLOR CORRECTION TO THE SEQUENTIAL COLOR SYSTEM BASED ON THE VIEW DURATION AND A TIMING PARAMETER ASSOCIATED WITH THE SEQUENTIAL COLOR SYSTEM", where the inertial color smear correction module or a color correction module (for example, the color correction module 530) may determine a color correction based on the view duration determined in block 624 and one or more timing parameters associated with the sequential color system. Such timing parameters may include a number of color components used to generate images and a color component time (for example, the color component time 108). The color correction may include a reduction in one or more excess color components and/or an increase in one or more deficient color components, as described above.

Finally, block 626 may be followed by block 628, "APPLY THE COLOR CORRECTION TO THE SEQUENTIAL COLOR SYSTEM FOR EVERY PIXEL IN THE IMAGE", where the inertial color smear correction module may apply the color correction determined in block 626 to the sequential color system for every pixel in the displayed image. The color correction may be applied at every pixel in the image and/or at a light source for the image, as described above.

Figure 7:
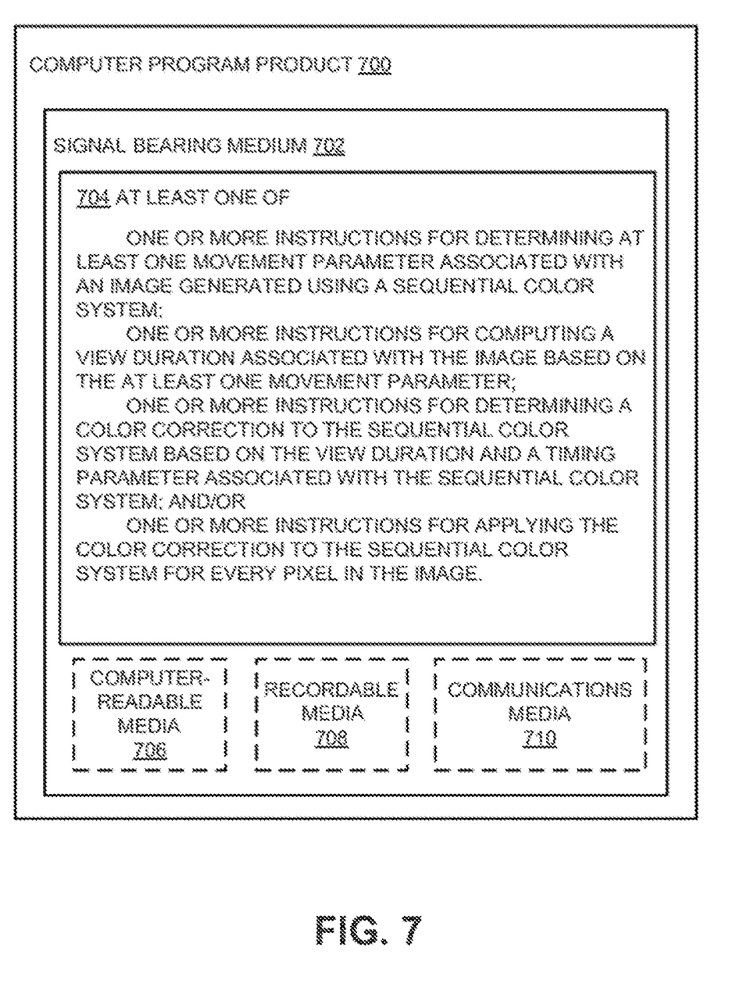
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, when executed by, for example, a processor may provide the functionality described herein. Thus, for example, referring to the processor 504 in FIG. 5, the image generation module 522 may undertake one or more of the tasks shown in FIG. 7 in response to the instructions 704 conveyed to the processor 504 by the signal bearing medium 702 to perform actions associated with color smear correction as described herein. Some of those instructions may include, for example, determining at least one movement parameter associated with an image generated using a sequential color system, computing a view duration associated with the image based on the at least one movement parameter, determining a color correction to the sequential color system based on the view duration and a timing parameter associated with the sequential color system, and/or applying the color correction to the sequential color system for every pixel in the image, according to some embodiments described herein.

In some implementations, the signal bearing media 702 depicted in FIG. 7 may encompass computer-readable media 706, such as, but not limited to, a hard disk drive, a solid state drive, a Compact Disc (CD), a Digital Versatile Disk (DVD), a digital tape, memory, etc. In some implementations, the signal bearing media 702 may encompass recordable media 708, such as, but not limited to, memory, read/write (R/W) CDs, R/W DVDs, etc. In some implementations, the signal bearing media 702 may encompass communications media 710, such as, but not limited to, a digital and/or an analog communication medium (for example, a fiber optic cable, a waveguide, a wired communications link, a wireless communication link, etc.). Thus, for example, the computer program product 700 may be conveyed to one or more modules of the processor 504 by an RF signal bearing medium, where the signal bearing media 702 is conveyed by the wireless communications media 710 (for example, a wireless communications medium conforming with the IEEE 802.11 standard).

According to some examples, a method is provided to correct color smear in an image generated using a sequential color system. The method may include determining at least one movement parameter associated with the image and computing a view duration associated with the image based on the at least one movement parameter. The method may further include determining a color correction to the sequential color system based on the view duration and a timing parameter associated with the sequential color system and applying the color correction to the sequential color system for every pixel in the image.

According to some embodiments, the image may be generated for a fixed heads-up display, a wearable display, and/or a mobile projector. The method may further include determining the at least one movement parameter based on an inertial measurement associated with the image. The at least one movement parameter may be a translational and/or a rotational parameter associated with the image and/or an entity to which the image is displayed. The method may further include using the at least one movement parameter to determine a rate of motion of a view of at least one pixel in the image across a virtual background sphere and computing the view duration based on the rate of motion. In some embodiments, the timing parameter may be a color component projection time.

According to other embodiments, the method may further include determining a color imbalance based on the view duration and the timing parameter and determining the color correction by decreasing an excess color component and/or increasing a deficient color component based on the color imbalance. The method may further include determining a rate of change of a background and determining the color correction based on the view duration, the timing parameter, and the rate of change of the background. Applying the color correction may include applying the color correction at every pixel in the image and/or applying the color correction at a light source for the image. The method may further include redetermining the at least one movement parameter, recomputing the view duration, redetermining the color correction, and reapplying the color correction in response to determining that the view duration has elapsed.

According to other examples, a computing device is provided to generate an image and correct color smear in the generated image. The computing device may include a sequential color system configured to switch between multiple different color components based on a color component projection time to generate the image and a processor block coupled to the sequential color system. The processor block may be configured to determine at least one movement parameter associated with the image, compute a view duration associated with the image based on the at least one movement parameter, and determine a color imbalance based on the view duration and the color component projection time. The processor block may be further configured to determine a color correction to the sequential color system based on the view duration and the color component projection time and apply the color correction to the sequential color system for each pixel in the image.

According to some embodiments, the computing device may be a fixed heads-up display, a wearable display, and/or a mobile projector. The processor block may be further configured to determine the at least one movement parameter based on an inertial measurement associated with the image. The at least one movement parameter may be a translational and/or a rotational parameter associated with the image and/or an entity to which the image is displayed. The processor block may be further configured to use the at least one movement parameter to determine a rate of motion of a view of at least one pixel in the image across a virtual background sphere and compute the view duration based on the determined rate of motion.

According to other embodiments, the processor block may be further configured to determine the color correction by decreasing an excess color component and/or increasing a deficient color component based on the color imbalance. The processor block may be further configured to determine a rate of change of a background and determine the color correction based on the view duration, the color component projection time, and the rate of change of the background. The processor block may be configured to apply the color correction by applying the color correction at every pixel in the image and/or applying the color correction at a light source for the image. The processor block may be further configured to redetermine the at least one movement parameter, recompute the view duration, redetermine the color correction, and reapply the color correction in response to determining that the view duration has elapsed.

According to further examples, an inertial color smear correction module is provided to correct color smear in a generated image. The module may include an inertial sensor data module communicatively coupled to at least one inertial sensor and a processor block coupled to the inertial sensor data module. The processor block may be configured to determine at least one movement parameter associated with a generated image based on an inertial measurement provided by the inertial sensor data module where the movement parameter(s) include a translational and/or a rotational parameter associated with the image and/or an entity to which the image is displayed. The processor block may be further configured to compute a view duration associated with the image based on the movement parameter(s), determine a color correction to a sequential color system used to generate the image based on the view duration and a timing parameter associated with the sequential color system, and apply the color correction to the sequential color system for each pixel in the image.

According to some embodiments, the image may be generated for a fixed heads-up display, a wearable display, and/or a mobile projector. The processor block may be further configured to use the movement parameter(s) to determine a rate of motion of a view of at least one pixel in the image across a virtual background sphere and compute the view duration based on the determined rate of motion. The timing parameter may be a color component projection time. The processor block may be further configured to determine a color imbalance based on the view duration and the timing parameter and determine the color correction by decreasing an excess color component and/or increasing a deficient color component based on the color imbalance.

According to other embodiments, the processor block may be further configured to determine a rate of change of a background and determine the color correction based on the view duration, the timing parameter, and the rate of change of the background. The processor block may be configured to apply the color correction by applying the color correction at every pixel in the image and/or applying the color correction at a light source for the image. The processor block may be further configured to redetermine the movement parameter(s), recompute the view duration, redetermine the color correction, and reapply the color correction in response to determining that the view duration has elapsed.

According to yet further examples, a computer readable medium may store instructions which when executed on one or more computing devices may execute a method to correct color smear in an image generated using a sequential color system. The methods may be similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (for example, as one or more programs executing on one or more computer systems), as one or more programs executing on one or more processors (for example, as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to correct color smear in an image generated using a sequential color system, the method comprising:
   determining at least one movement parameter associated with the image;
   computing a view duration associated with the image based on the at least one movement parameter;
   determining a color correction to the sequential color system based on the view duration and a timing parameter associated with the sequential color system;
   determining a color imbalance based on the view duration and the timing parameter;
   one or more of: decreasing an excess color component and increasing a deficient color component based on the color imbalance; and
   applying the color correction to the sequential color system for every pixel in the image.

2. The method of claim 1, further comprising determining the at least one movement parameter based on an inertial measurement associated with the image.

3. The method of claim 1, wherein the at least one movement parameter is one or more of: a translational and a rotational parameter associated with one or more of: the image and an entity to which the image is displayed.

4. The method of claim 1, further comprising:
   using the at least one movement parameter to determine a rate of motion of a view of at least one pixel in the image across a virtual background sphere; and
   computing the view duration based on the determined rate of motion.

5. The method of claim 1, wherein the timing parameter is a color component projection time.

6. The method of claim 1, further comprising:
   determining a rate of change of a background; and
   determining the color correction based on the view duration, the timing parameter, and the rate of change of the background.

7. The method of claim 1, further comprising:
determining that the view duration has elapsed; and
in response, redetermining the at least one movement parameter, recomputing the view duration, redetermining the color correction, and reapplying the color correction.

8. A computing device configured to generate an image and correct color smear in the generated image, the computing device comprising:
a sequential color system configured to switch between a plurality of different color components based on a color component projection time to generate the image; and
a processor block coupled to the sequential color system, the processor block configured to:
determine at least one movement parameter associated with the image;
compute a view duration associated with the image based on the at least one movement parameter;
determine a color correction to the sequential color system based on the view duration and a timing parameter associated with the sequential color system;
determine a color imbalance based on the view duration and the timing parameter;
one or more of: decrease an excess color component and increase a deficient color component based on the color imbalance; and
apply the color correction to the sequential color system for each pixel in the image.

9. The computing device of claim 8, wherein the processor block is further configured to determine the at least one movement parameter based on an inertial measurement associated with the image.

10. The computing device of claim 8, wherein the at least one movement parameter is one or more of: a translational and a rotational parameter associated with one or more of: the image and an entity to which the image is displayed.

11. The computing device of claim 8, wherein the processor block is further configured to:
use the at least one movement parameter to determine a rate of motion of a view of at least one pixel in the image across a virtual background sphere; and
compute the view duration based on the determined rate of motion.

12. The computing device of claim 8, wherein the processor block is further configured to:
determine a rate of change of a background; and
determine the color correction based on the view duration, the color component projection time, and the rate of change of the background.

13. The computing device of claim 8, wherein the processor block is configured to apply the color correction by at least one of:
applying the color correction at every pixel in the image; and
applying the color correction at a light source for the image.

14. The computing device of claim 8, wherein the processor block is further configured to:
determine that the view duration has elapsed; and
in response, redetermine the at least one movement parameter, recompute the view duration, redetermine the color correction, and reapply the color correction.

15. An inertial color smear correction module comprising:
an inertial sensor data module communicatively coupled to at least one inertial sensor; and
a processor block coupled to the inertial sensor data module, the processor block configured to:
determine at least one movement parameter associated with a generated image based on an inertial measurement provided by the inertial sensor data module, the at least one movement parameter comprising one or more of: a translational and a rotational parameter associated with one or more of: the image and an entity to which the image is displayed;
compute a view duration associated with the image based on the at least one movement parameter;
determine a color correction to a sequential color system used to generate the image based on the view duration and a timing parameter associated with the sequential color system;
determine a color imbalance based on the view duration and the timing parameter;
one or more of: decrease an excess color component and increase a deficient color component based on the color imbalance; and
apply the color correction to the sequential color system for each pixel in the image.

16. The inertial color smear correction module of claim 15, wherein the processor block is further configured to:
use the at least one movement parameter to determine a rate of motion of a view of at least one pixel in the image across a virtual background sphere; and
compute the view duration based on the determined rate of motion.

17. The inertial color smear correction module of claim 15, wherein the timing parameter is a color component projection time.

18. The inertial color smear correction module of claim 15, wherein the processor block is further configured to:
determine a rate of change of a background; and
determine the color correction based on the view duration, the timing parameter, and the rate of change of the background.

19. The inertial color smear correction module of claim 15, wherein the processor block is configured to apply the color correction by at least one of:
applying the color correction at every pixel in the image; and
applying the color correction at a light source for the image.

20. The inertial color smear correction module of claim 15, wherein the processor block is further configured to:
determine that the view duration has elapsed; and
in response, redetermine the at least one movement parameter, recompute the view duration, redetermine the color correction, and reapply the color correction.

* * * * *

UNITED STATES PATENT AND TRADEMARK OFFICE
CERTIFICATE OF CORRECTION

PATENT NO.         : 9,619,867 B2
APPLICATION NO.    : 14/413223
DATED              : April 11, 2017
INVENTOR(S)        : Kruglick Page 1 of 1

It is certified that error appears in the above-identified patent and that said Letters Patent is hereby corrected as shown below:

In the Specification

In Column 1, Line 8, delete "§371" and insert -- § 371 --, therefor.

In Column 1, Line 13, below "BACKGROUND", insert -- Unless otherwise indicated herein, the materials described in this section are not prior art to the claims in this application and are not admitted to be prior art by inclusion in this section. --.

Signed and Sealed this
First Day of August, 2017

Joseph Matal
*Performing the Functions and Duties of the
Under Secretary of Commerce for Intellectual Property and
Director of the United States Patent and Trademark Office*